United States Patent [19]

Roberts

[11] Patent Number: 4,759,232

[45] Date of Patent: Jul. 26, 1988

[54] LOCKING DIFFERENTIAL

[76] Inventor: Anthony D. Roberts, 1 Church Road, Menzies Creek, 3159, Victoria, Australia

[21] Appl. No.: 734,401

[22] Filed: May 15, 1985

[51] Int. Cl.$^4$ ............................................. F16H 1/44
[52] U.S. Cl. ..................................... 74/710.5; 74/713
[58] Field of Search .................. 74/710.5, 710, 711, 74/713, 665 GB, 757, 777; 192/67 R, 20, 85 A

[56] References Cited

U.S. PATENT DOCUMENTS

| | | | |
|---|---|---|---|
| 1,212,795 | 1/1917 | Mayer-Schlatter | 74/710.5 |
| 1,447,116 | 5/1922 | Baird et al. | 74/710.5 |
| 1,466,778 | 9/1923 | Woods | 74/710.5 |
| 1,625,564 | 4/1927 | Pollard | 74/777 |
| 1,719,095 | 7/1929 | West | 74/710.5 |
| 1,761,308 | 6/1930 | Morgan | 74/777 |
| 2,803,149 | 6/1954 | Pringle | 74/710.5 |
| 3,090,254 | 5/1963 | Stump | 74/710.5 |
| 3,369,428 | 2/1968 | Hughson | 74/710.5 |
| 3,498,154 | 3/1970 | Müller-Berner | 74/710.5 |
| 3,732,752 | 5/1973 | Louckes et al. | 74/710.5 |
| 3,913,414 | 10/1975 | Freiburger | 74/710.5 |
| 4,043,224 | 11/1975 | Quick | 74/710.5 |
| 4,186,625 | 2/1980 | Chamberlain | 74/777 |
| 4,555,962 | 12/1985 | Bucarelli | 74/710.5 |
| 4,644,823 | 2/1987 | Mueller | 74/710.5 |

FOREIGN PATENT DOCUMENTS

| | | |
|---|---|---|
| 511665 | 12/1979 | Australia . |
| 511700 | 7/1980 | Australia . |
| 3025282 | 2/1982 | Fed. Rep. of Germany . |
| 1302401 | 7/1962 | France . |
| 2530766 | 1/1984 | France ............................. 74/710.5 |
| 2019511 | 10/1979 | United Kingdom . |

Primary Examiner—David Novais
Assistant Examiner—David Novais
Attorney, Agent, or Firm—Scully, Scott, Murphy & Presser

[57] ABSTRACT

A differential locking system in which the differential includes a differential carrier (1) which rotatably supports a pair of bevel gears (2,3) as well as a pinion gear (4) which meshes with the bevel gears (2,3) and is mounted for rotation on a shaft (5) supported by the differential carrier (1), the locking system including an annulus (6) splined to the carrier (1) and slideable axially of the carrier to cause engagement between splined teeth (9) on the annulus (6) and co-operating spline teeth (10) formed on one of the bevel gears (3) to lock the differential. The necessary axial movement of the annulus (6) is achieved by way of an annular piston (11) arranged in an annular cylinder (12) formed in the carrier (1) around the opposite bevel gear (2), and an actuating sleeve (13) which extends from the piston (11) to the annulus (6) to which it is rigidly attached, so that actuation of piston (11) causes the axial movement.

13 Claims, 1 Drawing Sheet

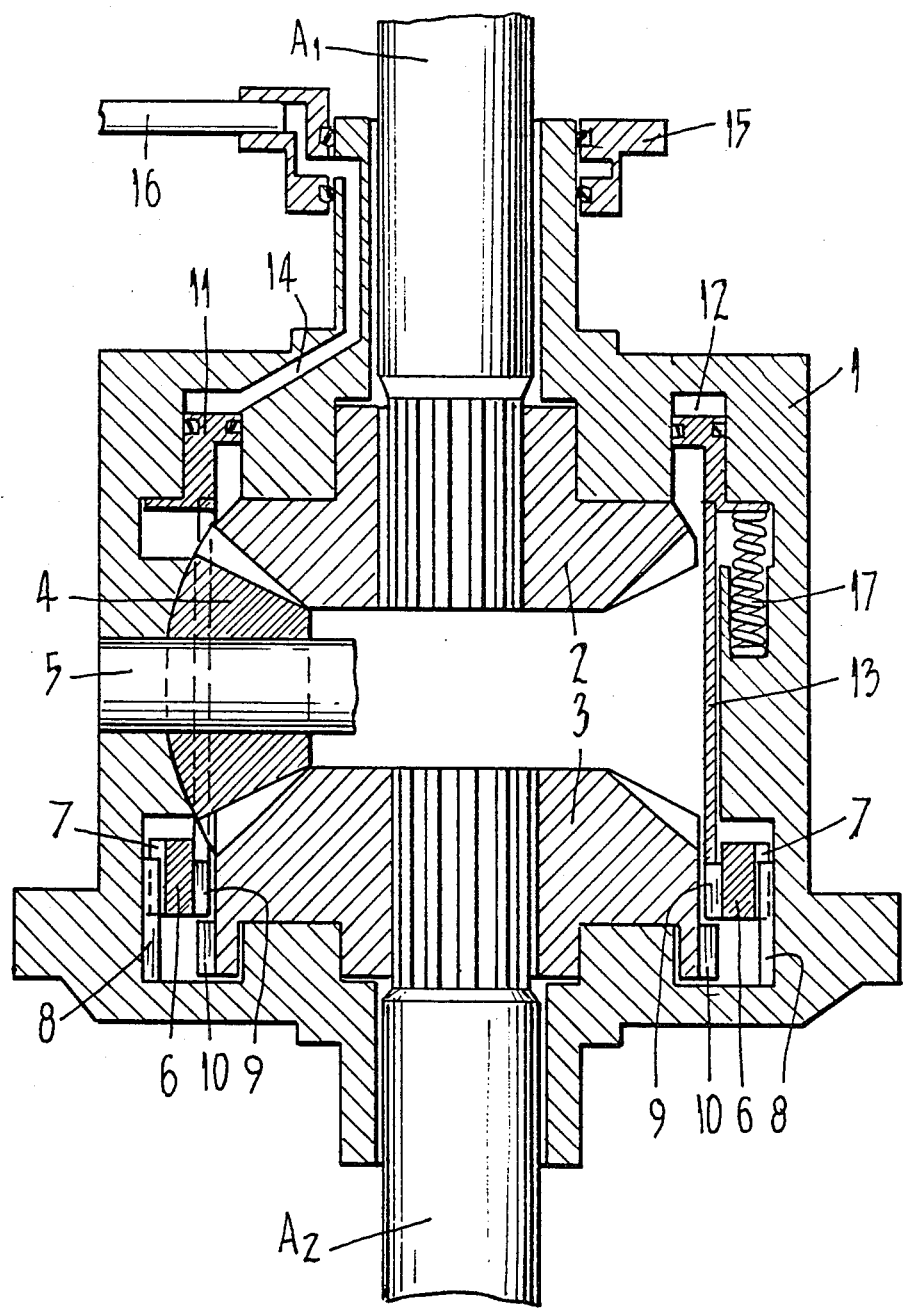

LOCKING DIFFERENTIAL

BACKGROUND OF THE INVENTION

This invention relates to locking differentials for motor vehicles and other machines.

Various types of locking differential have been proposed, such as for example, in Patent Publications AU-B-511,665, AU-B-511,700, AU-A-41,416/78 and GB-A-2,019,511. In each of the above examples, the locking mechanism is either complex, difficult or inconvenient to actuate and/or requires substantial modification to the rear axle housing and/or differential carrier to accomodate the mechanism.

There is a need for a locking differential which is simple to manufacture or to convert an existing differential and which nevertheless does not require substantial modification to the differential axle housing.

SUMMARY OF THE INVENTION

The invention therefore provides a differential locking system in which the differential includes a differential carrier supporting a pair of bevel gears adapted to be splined to axle shafts and at least one pinion gear which meshes with said pair of bevel gears, said locking system including locking means keyed or splined to said carrier so as to be capable of axial movement relative to said carrier, said locking means including locking tooth or spline means adapted to engage similar tooth or spline means associated with one of said bevel gears to prevent rotation of that bevel gear relative to said carrier.

In one form of the invention, the locking system includes an annulus splined to the carrier and slidable axially to cause engagement between spline teeth on said annulus and said locking tooth or spline means associated with said one of said bevel gears.

In a particularly preferred form of the invention, the locking system further comprises an annular chamber formed in said differential carrier and an annular piston positioned to axially move said locking means when said annular chamber is charged with compressed air or some other suitable fluid under pressure A return spring is preferably provided to return the piston to its disengaged position on de-activation of the source of compressed air.

BRIEF DESCRIPTION OF THE DRAWINGS

One particularly preferred form of the invention will now be described with reference to the accompanying drawing which is a somewhat schematic sectional elevation of a differential carrier incorporating a locking system embodying the present invention. It will be appreciated that only part of the differential gear adapted to be locked by the locking system embodying the invention is shown for purposes of clarity.

DETAILED DESCRIPTION OF THE PREFERRED EMBODIMENT

As is usual, the differential includes a differential carrier 1 which rotatably supports a pair of bevel gears 2, 3 in the usual manner as well as a pinion gear 4 which meshes with the bevel gears 2, 3 and is mounted for rotation on a shaft 5 supported by the casing 1. Half axles $A_1$ and $A_2$ have their splined ends engaging splined openings in the bevel gears 2, 3 and passing through the casing 1 in the manner shown.

The locking system embodying the present invention comprises an annulus 6 formed with outwardly directed spline teeth 7 which engage mating spline teeth 8 formed in the differential casing 1 surrounding the bevel gear 3 so that the annulus 6 is axially slidable in the splines 8 relative to the carrier 1. The annulus 6 is similarly formed with inwardly directed spline teeth 9 which are adapted to co-operate with spline teeth 10 formed around the lower periphery of the bevel gear 3.

Axial movement of the annulus 6 is achieved by means of an annular piston 11 arranged in an annular cylinder 12 formed in the casing 1 around the other bevel gear 2, and to which is attached an actuating sleeve 13 which extends from the piston 11 to the annulus 6, to which it is rigidly attached. The sleeve 13 is formed with a cut-out portion around the pinion 4 which enables axial movement of the sleeve 13 by means of the piston 11 to cause engagement between the spline teeth 9 on the annulus 6 and the corresponding spline teeth 10 on the bevel gear 3.

The piston 11 is actuated by means of compressed air, or some other suitable fluid under pressure, which is communicated to the cylinder 12 by means of a passage 14 formed in the casing 1, and around the inlet opening to which an annular collar 15 is sealingly arranged. Compressed air is delivered by means of a pipe 16 which is connected to a fitting (not shown) on the axle casing (not shown).

A piston return spring 17 is housed in a pocket in the casing 1 and bears against the piston 11 as shown to bias the piston towards it de-activated position.

It will be appreciated that compressed air may be delivered to the cylinder 12 via the pipe 16 and passage 14 by actuation of a valve suitably located in the driver's cabin of the vehicle to which the differential is fitted. The compressed air drives the piston 11 axially in the cylinder 12 and causes the sleeve 13 to axially move the annulus 6 to cause engagement between the spline teeth 9 and 10 to thereby lock the bevel gear 3 against rotation. When differential action is again required, the valve in the driver's cabin is returned to the de-activated position and the spring 17 returns the piston 11 to the position shown in the drawing whereby the spline teeth 9 on the annulus 6 are disengaged from the spline teeth 10 on the bevel gear 3.

While the above described embodiment of the invention is presently preferred, it should be appreciated that the specific form described is not essential to the invention. For example, the annulus 6 may be replaced by a segment formed with spline teeth similar to 9 adapted to engage the spline teeth 10 on the bevel gear 3, in which case the sleeve 13 would be replaced by a suitable connecting rod or element. Similarly, the piston 11 may be replaced by some form of mechanically or electrically operated actuator. For example, the annulus or segment may form part of an electro-magnetic actuator to cause suitable locking of the bevel gear.

In the above described embodiment, the differential casing 1 is adapted to be substituted for an existing differential casing in a non-locking differential to thereby convert the differential into a locking differential. Of course, the differential casing may be substituted at the time of initial manufacture where a locking differential is required. Although substitution of the described differential casing is presently preferred, it may be possible where the structure of the differential casing is such as to facilitate conversion, to convert an existing non-locking differential casing to a locking differential casing by the addition of the locking system components described above.

The entire contents of the provisional specification lodged with Australian patent application No. PG 2642 are hereby imported into this specification and form part of the disclosure of this specification.

The claims form part of the disclosure of this specification.

I claim:

1. A locking system for a differential gear including a differential carrier having a body defining an internal cavity within which a pair of bevel gears and at least one pinion gear which meshes with said pair of bevel gears are housed, said bevel gears being located on first and second, opposite side, respectively, of the pinion gear, and being adapted to be splined to axial shafts, said locking system including a locking means positioned inside the cavity of the carrier body between the carrier body and at least one of said bevel gears, said locking means including
   (i) an annular ring extending around said one of the bevel gears, on the first side of the pinion gear,
   (ii) external locking teeth or spline means extending outward from an outside surface of the annular ring, the carrier including co-operating teeth or spline means,
   (iii) internal locking teeth or spline means extending inward from an inside surface of the annular ring, said one of said bevel gears being formed with co-operating teeth or spline means,
   (iv) cylinder means defined by the body of the carrier on the second side of the pinion gear, and
   (v) an actuator housed in the cylinder means and movably supported therein to cause movement of said locking means relative to said carrier body whereby said external locking teeth or spline means engages said cooperating teeth or spline means of the carrier, and said internal locking teeth or spline means engages said teeth or spline means on the one bevel gear to prevent rotation of the one bevel gear relative to said carrier body to thereby lock said differential gear.

2. The locking system of claim 1, wherein said annular ring is slidable axially to cause engagement between spline teeth on said annular ring and said locking tooth or spline means associated with said one of said bevel gears.

3. The locking system of claim 2, wherein said actuator comprises a piston housed in said cylinder means and connected to said locking means to cause said axial movement of said locking means relative to said carrier.

4. The locking system of claim 3, wherein said piston and cylinder are annular and are arranged to surround the axle of the other of said bevel gears, said piston being connected to said locking means by means of an annular sleeve surrounding said bevel gears and including aperture means through which the pinion gear is located.

5. The locking system according to claim 4, wherein passage means are provided or charging said cylinder with compressed air under the control of valve means.

6. A differential locking system according to claim 1 wherein:
   said locking means further includes a sleeve having first and second axial ends and supported for sliding movement in the body;
   the first axial end of the sleeve extends around said one bevel gear, and the second axial end of the sleeve extends around said other bevel gear,
   the annular ring of the locking means is connected to the first axial end of the sleeve;
   the second axial end of the sleeve is connected to the actuator means, wherein movement of the actuator means within the cylinder means moves the sleeve to move the internal locking teeth or spline means of the locking means of the locking means to engage said teeth of spline means on said one bevel gear.

7. A differential locking system according to claim 6, wherein:
   the sleeve defines a side opening; and the pinion gear extends through said side opening.

8. A locking differential comprising a differential carrier having a body defining an internal cavity within which a pair of bevel gears and at least one pinion gear which meshes with said pair of bevel gears are supported, said bevel gears being located on first and second, opposite sides, respectively, of the pinion gear, and being adapted to be splined to axle shafts, and a locking system including locking means keyed or splined to said carrier within said internal cavity between said carrier body and at least one of said bevel gears so as to be capable of axial movement relative to said carrier body, said locking means including
   (i) an annular ring extending around said one of the bevel gears, on the first side of the pinion gear,
   (ii) external locking teeth or spline means extend outward from an outside surface of the annular ring and adapted to engage similar tooth or spline means on the carrier to prevent rotation of the annular ring relative to the carrier,
   (iii) internal locking tooth or spline means extending inward from an inside surface of the annular ring and adapted to engage similar tooth or spline means associated with a said one bevel gear to prevent rotation of the one bevel gear relative to said carrier,
   (iv) cylinder means defined by the body of the carrier on the second side of the pinion gear, and
   (v) an actuator housed in the cylinder means and movably supported therein to cause said axial movement of said locking means relative to said carrier body.

9. A kit for converting a differential to a locking differential, said kit including:
   a differential carrier having a body defining an internal cavity within which a pair of bevel gears and at least one pinion gear are adapted to be supported with the bevel gears located on first and second, opposite sides, respectively, of the pinion gear,
   a locking means adapted to be keyed or splined to said differential carrier so as to be capable of axial movement relative to said carrier body between said carrier body and at least one of said bevel gears, said locking means including
   (i) an annular ring adapted to extend around one of said bevel gears, on the first side of the pinion gear,
   (ii) external locking teeth or spline means extending outward from an outside surface of the annular ring, the carrier including co-operating teeth or spline means adapted to engage said external locking teeth or spline means to prevent rotation of the annular ring relative to the carrier, and (iii) internal locking teeth or spline means extending inward from an inside surface of the annular ring, and a replacement bevel gear formed with tooth or spline means which are adapted to co-operate with said internal locking teeth or spline means to prevent rotation of the replacement bevel gear relative to said carrier, said carrier body defining a cylinder located on the second side of the pinion gear and adapted to house an actuator for causing axial movement of said locking means relative to said carrier in use.

10. A differential gear, comprising:

a carrier having a body defining an internal cavity and a cylinder chamber;

a pinion gear supported in the internal cavity;

a first and second bevel gears supported in the internal cavity to connect the differential gear to first and second axles, the first and second bevel gears being located on first and second, opposite sides, respectively, of the pinion gear and drivingly engaging said pinion gear;

locking means supported in the internal cavity for sliding movement therein between an unlocking position wherein the bevel gears are supported in the carrier for rotation relative to the carrier, and a locking position wherein the locking means engages the carrier and the first bevel gear to prevent rotation of the first bevel gear to the carrier; and actuator means supported in the cylinder chamber defined by the carrier body to slide the locking means between the locking and unlocking positions;

the carrier including a carrier tooth located inside the carrier, the first bevel gear including a gear tooth located inside the carrier, and the locking means including (i) an annular ring extending around the first bevel gear, on the first side of the pinion gear, (ii) external locking teeth or spline means extending outward from an inside surface of the annular ring, and (iii) internal locking teeth or spline means extending inward from an inside surface of the annular ring;

the cylinder chamber defined by the carrier body being located on the second side of the pinion gear;

when the locking means is in the locking position, the external locking teeth or spline means engage the carrier tooth, and the internal locking teeth or spline mans engage the gear tooth to prevent rotation of the first bevel gear relative to the carrier.

11. A differential gear according to claim 10, wherein:

the locking means further includes a sleeve having first and second axial ends and supported for sliding movement in the internal cavity of the body.

the first axial end of the sleeve extends around the first bevel gear, and the second axial end of the sleeve extends around the second bevel gear;

the annular ring is connected to the first axial end of the sleeve for sliding movement therewith;

the cylinder chamber comprises an inside annular chamber axially aligned with the sleeve; and the actuator means includes a piston supported for sliding movement in the annular chamber and connected to the sleeve to move the internal locking teeth or spline means into engagement with the gear tooth.

12. A differential gear according to claim 11, wherein:

the sleeve includes a side opening, and the pinion gear extends through said side opening.

13. A differential gear according to claim 12, wherein:

the carrier body further defines a socket; and the actuator means further includes a spring held in said socket, engaging the piston and urging the piston to move the internal locking teeth or spline means out of engagement with the gear tooth.

* * * * *

UNITED STATES PATENT AND TRADEMARK OFFICE
CERTIFICATE OF CORRECTION

PATENT NO. : 4,759,232

DATED : July 26, 1988

INVENTOR(S) : Anthony D. Roberts

It is certified that error appears in the above-identified patent and that said Letters Patent is hereby corrected as shown below:

Column 1, line 44: "pressure A" should read as --pressure. A--

Column 3, line 15: "side" should read as --sides--

Column 3, line 62: "or" should read as --for--

Column 4, line 10: delete the second occurrence of "of the locking means"

Column 4, line 32: "extend" should read as --extending--

Column 4, line 40: "with a said" should read as --with said--

Signed and Sealed this

Twelfth Day of June, 1990

Attest:

*Attesting Officer*

HARRY F. MANBECK, JR.

*Commissioner of Patents and Trademarks*